UNITED STATES PATENT OFFICE.

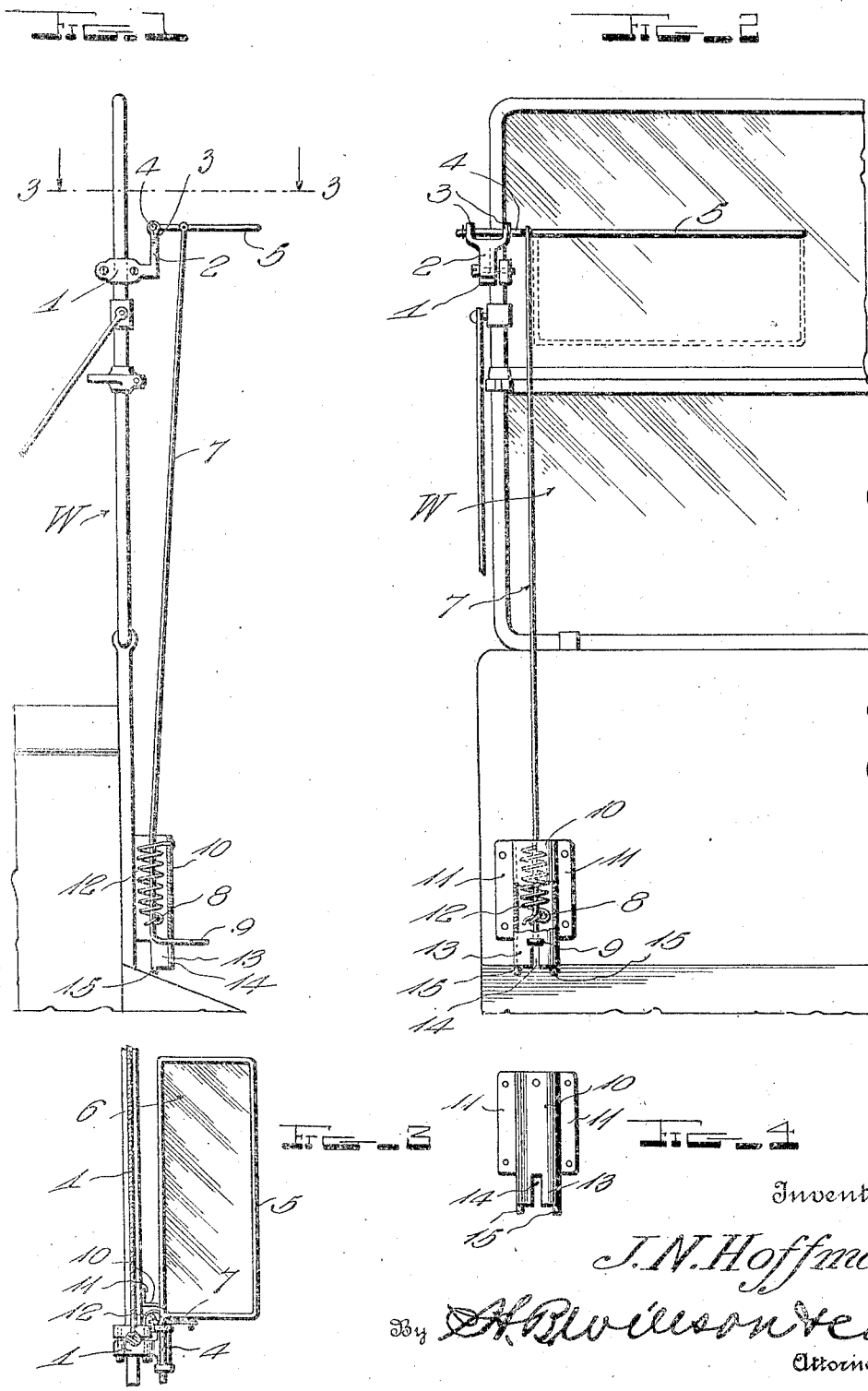

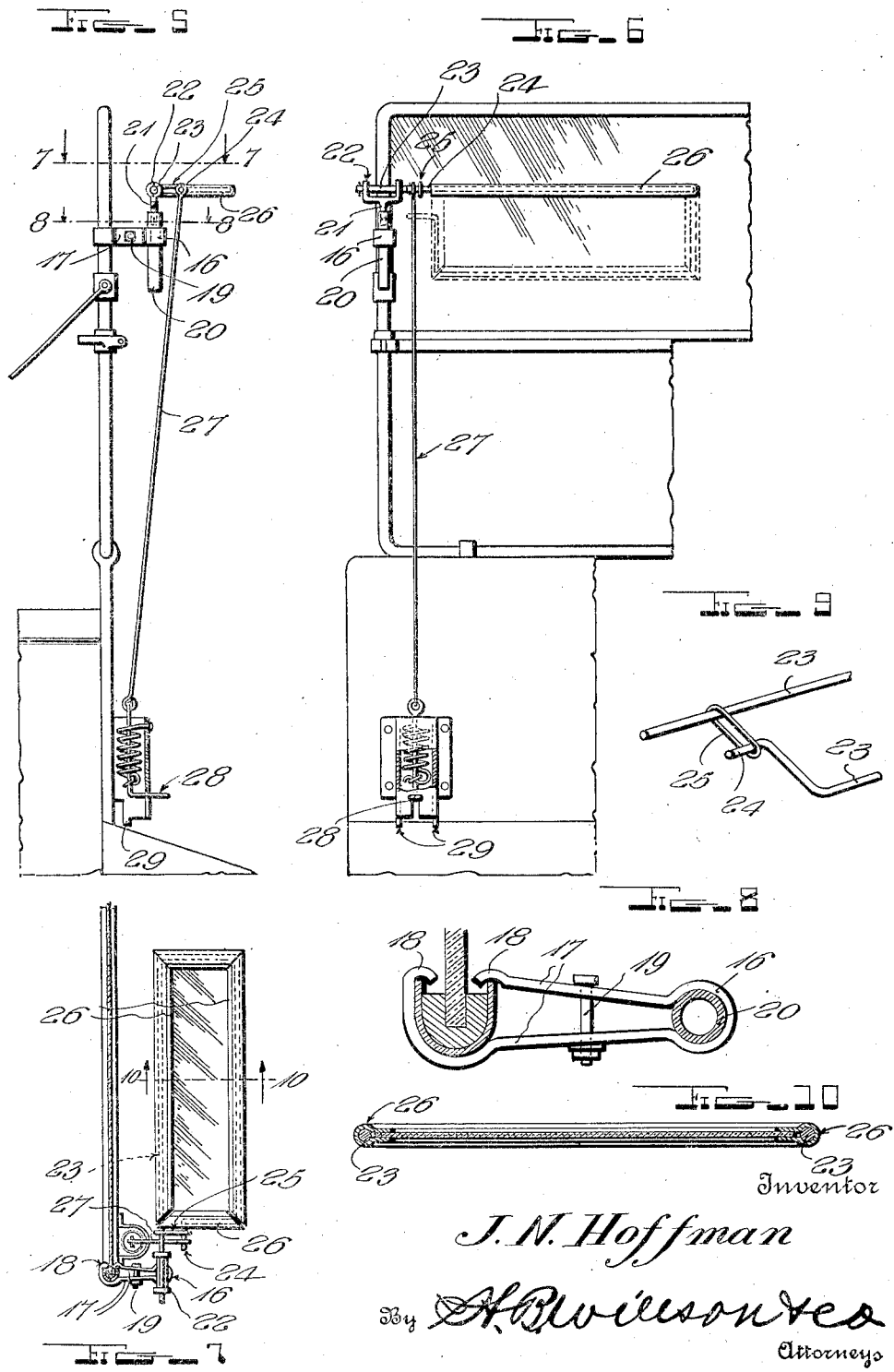

JOHN N. HOFFMAN, OF FOREST GROVE, OREGON.

AUTOMOBILE DIMMER-SHADE.

1,362,866. Specification of Letters Patent. Patented Dec. 21, 1920.

Application filed January 8, 1920. Serial No. 350,127.

*To all whom it may concern:*

Be it known that I, JOHN N. HOFFMAN, a citizen of the United States, residing at Forest Grove, in the county of Washington and State of Oregon, have invented certain new and useful Improvements in Automobile Dimmer-Shades; and I do declare the following to be a full, clear, and exact description of the invention, such as will enable others skilled in the art to which it appertains to make and use the same.

This invention relates to improvements in dimmer shades for automobiles.

The primary object of the invention is to provide a simple and practical dimmer of the above mentioned type which is adapted to be attached to the windshield in such a manner that it may be swung into a position to protect the eyes of the driver from the glare of headlights of an approaching machine, the device being normally retained in inoperative position, and being of such construction that it may be easily and quickly moved to operative position by means of a foot-pedal which is disposed adjacent the foot-boards of the machine within convenient operating distance of the driver's feet.

Another object of the invention is to provide a device of the above mentioned character which is of such construction that the translucent material which forms the guard for the eyes, may be readily removed from its supporting frame and replaced by a new piece should it become damaged in any way.

With the above and other objects in view, the invention consists of certain novel features of construction and the combination and arrangement of parts as will be more fully described and claimed.

I attain the above mentioned objects by the mechanism illustrated in the accompanying drawings in which—

Figure 1, is a side elevation, partly in section, of a device constructed in accordance with my invention;

Fig. 2, is a front elevation, the shade being shown dotted and being in operative position;

Fig. 3, is a horizontal section taken on the line 3—3 of Fig. 1;

Fig. 4 is a front elevation of the coil spring casing;

Fig. 5 is a side elevation of a modified form of the invention;

Fig. 6 is a front elevation of the modified form;

Fig. 7 is a horizontal section taken on the line 7—7 of Fig. 5;

Fig. 8 is a detail section taken on the line 8—8 of Fig. 5;

Fig. 9 is a detail perspective view of the inner end of the sheet carrying frame; and Fig. 10 is a sectional view taken on the line 10—10 of Fig. 7.

Similar numerals of reference designate similar parts throughout the several views.

Reference is now had to the drawing in which is shown an automobile windshield W of the ordinary construction.

Removably and adjustably mounted on one vertical side bar of the windshield frame is a three-part metal clamp 1, one section being provided with a vertical extension 2, whose upper end is increased in size and bifurcated, thus forming two spaced vertically extending arms 3, in which are formed a pair of alined bearing openings. Suitably mounted in the bearing openings, is a rock-shaft 4, which extends longitudinally of the automobile windshield and carries an open frame 5, said frame preferably, though not necessarily, comprising a strip of metal bent into substantially U-shape, and having its arms secured to said rock-shaft. This frame is adapted to have secured to it in any suitable manner, a sheet of translucent material 6 such as colored celluloid.

A rod 7 is adapted to be secured to the open frame 5, at a point spaced from the rock shaft, preferably to one of the side bars of said frame, said rod being of sufficient length to extend downwardly to a point adjacent the floor of the automobile. At a point near the floor, the rod is bent to form a loop 8 and then is extended downwardly a short distance, said rod then being bent laterally to form a foot-pedal 9.

The lower end of the rod 7, exclusive of the pedal, is inclosed by a metal casing 10, said casing comprising a piece of sheet metal bent into substantially U-shape, the metal forming the arms being bent laterally to form attaching flanges 11 for attaching the casing to an automoobile. Disposed in said casing is a coil spring 2, through which the rod 7 is passed, said loop 8 being secured to the lower end of said spring. The upper end of the spring is secured to the casing at a point positioned a sufficient distance from the loop to make it necessary to stretch the end of the casing 10.

The casing 10 is provided with a downwardly extending portion 13 which is slotted vertically at 14, the slot opening through the lower end of said portion.

The outer lower corners of said portion are provided with studs or stops 15 which are adapted to limit the swinging movement of the pedal when it is moved to lock it in its lowered position.

As illustrated in Fig. 1, the dimmer shade is in position when the pedal is contacting the casing, this being the normal position due to the action of the coil spring on the rod. When circumstances require use of the shade, the operator or driver of the machine may quickly throw the shade in operative position by pressing down on the pedal 9 with his foot, this operation causing the rock-shaft to turn and lower the shade.

In a modified form of my invention I form an attaching arm from a single length of spring metal which is bent upon itself to form an open loop 16, the ends of the strip of metal being then directed outwardly to form a pair of spaced diverging arms 17. One of the arms is considerably longer than the other and is curved longitudinally and bent laterally into the plane of the other or shorter arm, both of said arms being provided at their extreme ends with the curved fingers 18 which are adapted to engage the opposite edges of one side bar of a windshield frame. These arms 17 are held together by means of a bolt 19 or the like, whereby the support is positively held in any adjusted position to the windshield. This bolt also serves to clamp a pipe section 20 in said loop 16.

The pipe section 20 is preferably tapered toward its lower end and internally threaded at its upper end for engagement with the stem 21 of a yoke 22 whose vertically extending arms are provided with horizontally alined openings which serve as bearings for a rock-shaft 23.

The rock-shaft 23 is preferably formed from a metal rod, the outer end portion being bent to form an open frame as illustrated in Figs. 7 and 9 of the drawings, the extreme outer end 24 of said rod being bent parallel with respect to the rock-shaft proper and spaced therefrom. For the purpose of retaining the extreme end 24 in proper spaced relation with the rock-shaft proper, a link 25 formed of any suitable material is carried by said rock-shaft and is adapted to engage said extreme end 24.

A sheet of celluloid or other suitable translucent material is adapted to be positioned in the open frame and in order to permit it to be removed whenever desired, I provide channel members 26 which are carried by each bar of the frame. These channel members are preferably formed from spring-metal strips which are bent into substantially U-shape and fit on each bar of the frame, the spaced edges of the metal extending a short distance inwardly from the bars of the frame to receive the edges of the translucent sheet of material between them. The channel members may consist of four sections, that is, there may be two long ones; one for each of the longitudinal bars and one for each end or transverse bar of the frame, each one being readily detachable. However, as shown, there are only two parts; a single part to engage the two long bars and the short bar remote from the attaching member; and a detachable section for the opposite short bar, the latter being provided with two apertures, one for the extremity 24 to extend through and one for the rock-shaft 23 to extend through, or it may be notched to straddle the last named part. By the arrangement described, it is apparent that should a sheet of material which is disposed in the frame become damaged in any way, it may be removed and replaced by a new sheet by simply removing the link 25, pulling the end 24 away from the rock-shaft 23, and removing the detachable channel member.

Secured at its upper end to the extreme end 24 is a vertically disposed rod 27, whose lower end is attached to the operating means including a foot-pedal 28 which is inclosed in a metal casing, the latter being secured to the automobile foot-board in convenient reach of the operator. Disposed in said casing is a coil spring which surrounds the vertical portion of the foot-lever, the upper end of the said spring being secured to the upper end portion of the casing and having its lower end secured to the foot-pedal in any manner so that the pedal will normally be held in inoperative position.

In the position with the pedal positioned as above stated the sheet carrying frame is disposed in an inoperative position. Should it be desired, because of the glare from the headlights on an approaching automobile or the like, to move the frame to operative position, the pedal 28 will be depressed, thereby enabling the operator to pass the oncoming vehicle with safety. When it is necessary to hold the sheet in operative position for any length of time, the pedal will be then shifted laterally in either direction beneath the bottom edge of the casing thereby preventing the coil spring from moving the device into inoperative position. The lateral movement of the pedal is limited by the stops 29 formed on the lower end of the casing.

From the foregoing description taken in connection with the accompanying drawing, the construction and operation of the invention will be readily understood without requiring a more extended explanation.

Various changes in the construction, proportion, and arrangement of parts may be resorted to without departing from the principle, or sacrificing any of the advantages of the claimed invention.

I claim:

1. A dimmer shade for attachment to automobile windshields comprising a bracket to be attached to one of the movable sections of the windshield, a bearing carried thereby, a substantially rectangular open frame for disposition across the inner side of the windshield, said frame including a journal which is rotatable in said bearing, a casing for connection to a portion of the machine adjacent the foot-boards, a foot operated member slidable in the casing, coacting means between the latter and the member for retaining the member in effective position, a coiled spring surrounding the member, having one of its ends connected thereto and its opposite end secured to the casing, a connection between the aforesaid journal and the foot controlled member, and a dimmer shade carried by the frame.

2. A device of the class described comprising a clamp, a yoke carried by said clamp, a rock-shaft journaled at one of its ends in said yoke, the other end of said rock-shaft being bent to form a substantially rectangular open frame, the extreme end of said rock-shaft being bent parallel with respect to the shaft proper, said extreme end being spaced from the shaft proper, means for holding said end against separation from the shaft proper, channel members having an opening through which said extreme end extends, a sheet of translucent material disposed in said frame with its edges received between the edges of the channel members, a rod secured at its upper end to said frame, and means associated with the lower end of said rod to actuate the frame.

3. A device of the class described comprising a strip of spring metal bent to form a loop, the ends of the loop forming strip diverging outwardly to form arms, one arm having its end bent inwardly to form a finger, the other arm being extended beyond the first arm and curved longitudinally and laterally and then bent to form a finger to engage one edge of one side of a windshield frame, the first named finger being adapted to engage the opposite edge of said side of a windshield, a pipe section disposed in said loop, a bolt connecting said arms and adapted to secure the arms to the windshield and the pipe in said loop, a yoke carried by said pipe section, a rock-shaft carried by said yoke, a sheet of translucent material carried by said shaft, and means for moving the sheet into and out of operative position.

In testimony whereof I have hereunto set my hand.

JOHN N. HOFFMAN.